United States Patent [19]

Muntean

[11] 4,128,018

[45] Dec. 5, 1978

[54] DRIVE WHEEL

[76] Inventor: Andy Muntean, 20827 Sparta La., Olympia Fields, Ill. 60461

[21] Appl. No.: 837,081

[22] Filed: Sep. 28, 1977

[51] Int. Cl.² .......................... F16H 1/06; F16H 55/12
[52] U.S. Cl. .......................................... 74/413; 74/447
[58] Field of Search ................ 74/413, 439, 446, 447; 29/159.2; 30/380, 274

[56] References Cited

U.S. PATENT DOCUMENTS

| | | | |
|---|---|---|---|
| 2,605,645 | 8/1952 | Tharpe et al. | 74/413 |
| 3,557,633 | 1/1971 | Frerichs | 74/447 |
| 4,043,214 | 8/1977 | Westlake | 74/447 X |

*Primary Examiner*—Leonard H. Gerin
*Attorney, Agent, or Firm*—Merriam, Marshall & Bicknell

[57] ABSTRACT

A drive wheel assembly for a machine tool of the band saw type comprises a rim section adapter to engage and drive an endless saw or the like and a hub section removably attached to the rim section. The rim section is provided with internal gear teeth adapted to engage a driven pinion gear, while the hub section contains a central hub adapted to engage a shaft about which the assembly rotates.

4 Claims, 3 Drawing Figures

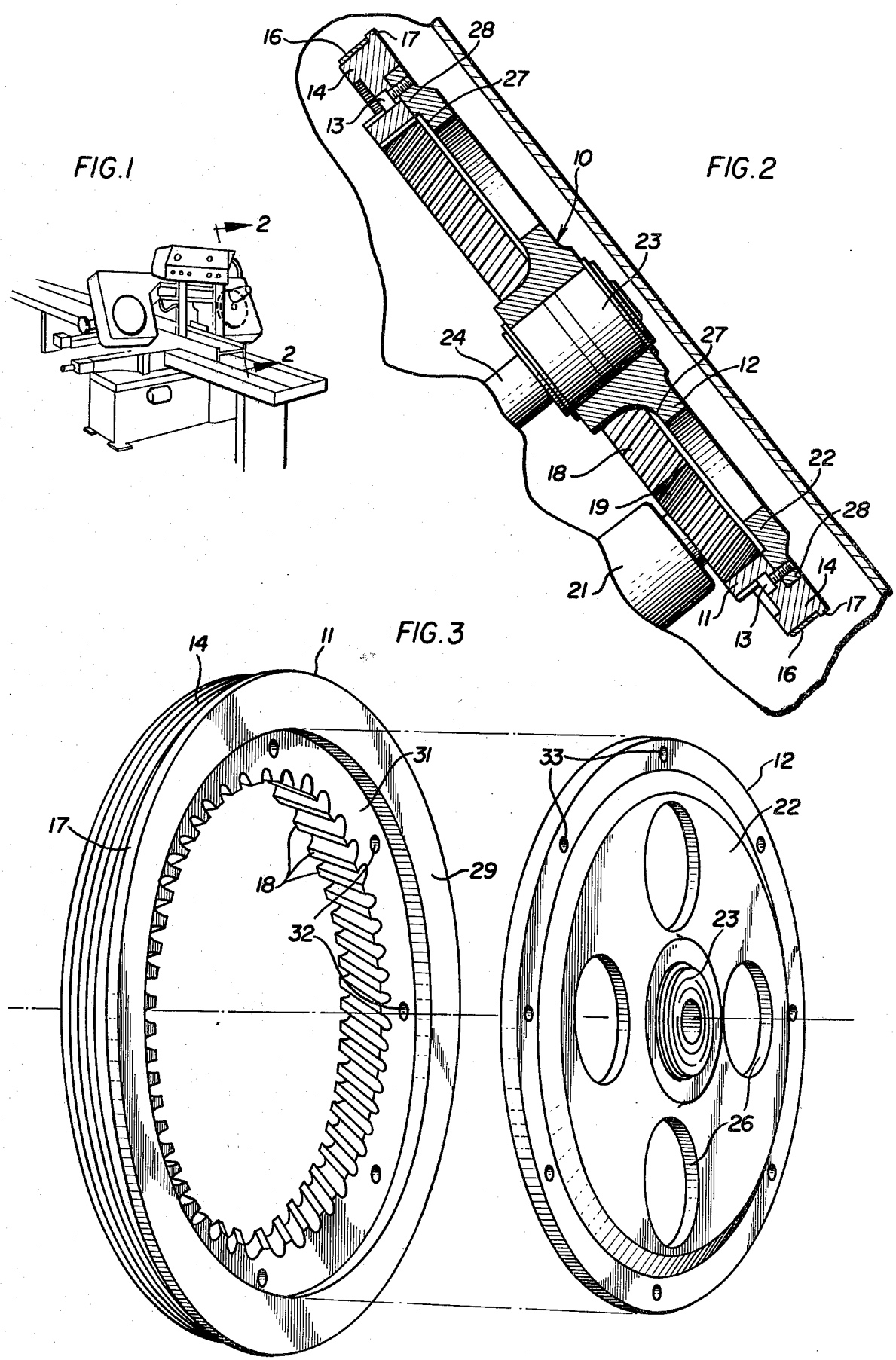

DRIVE WHEEL

The present invention relates generally to an improved drive wheel assembly for machine tools. More particularly, the invention provides a novel band wheel assembly for a band saw or the like.

BACKGROUND

Band saws are customarily employed in industrial applications as tools for cutting metal. Such saws generally include a band saw head assembly having an endless saw band trained about a plurality of band wheels mounted for rotation on spaced parallel axes. One of the wheels about which the saw band is trained (the drive wheel) is power driven and drives the band by frictional engagement between the periphery of the wheel and one face of the band.

Power is transferred to the drive wheel through a gear assembly comprising an internal ring gear, i.e., one in which the teeth project inwardly from the inside periphery of the drive wheel, and a smaller pinion gear which is interconnected to a driving motor.

Band saws cut through metal at a very high rate of speed and thus generate metal chips as they cut through the metal workpiece. Although a number of cleaning systems are employed to remove these chips from the blade and band saw assembly, a quantity of metal chips eventually find their way into the gear assembly, despite all precautions. These chips, lodged between the gear teeth, accelerate the wear of the gear assembly with the result that the gears must be replaced relatively frequently.

In the conventional drive wheel assembly, the ring gear is integral with a unitary drive wheel. Thus, replacement of a worn ring gear can only be accomplished by replacing the entire drive wheel, large portions of which may be in satisfactory working condition. In view of the fact that such wheels are large, machine-formed balanced castings, replacement costs are substantial.

SUMMARY OF THE INVENTION

The present invention describes an improved drive wheel assembly comprising two major sections and bolts or other means for joining them together. As a result, a significant portion of the drive wheel assembly can be preserved when it is necessary to remove and replace a worn ring gear. This can result in savings of between 20 and 40% compared with the cost of a prior art unitary drive wheel assembly.

Although the two sections of the present invention preferably undergo a separate machining operation to make them easily joinable, this is offset somewhat by the fact that the two-piece drive wheel is easier to case, particularly in the area of the ring gear.

Both the ring gear teeth and the peripheral surface of the drive wheel must be hardened to withstand wear due to friction. A conventional drive wheel, therefore, being one-piece, has undergone a hardening process. Thus, all portions of the drive wheel have become more brittle than if unhardened. In the two-section wheel of the present invention, one section can be left unhardened and thus remains softer and less likely to break.

DESCRIPTION OF THE DRAWINGS

Other advantages of the improved drive wheel assembly will become apparent to those skilled in the art from the following detailed description thereof, taken in conjunction with the accompanying drawings, in which:

FIG. 1 is an isometric view of a typical power tool of the band saw type, in which the drive wheel assembly of the invention can be used;

FIG. 2 is a fragmentary cross-sectional view along the line 2—2 of FIG. 1, showing the drive wheel assembly of the invention in an assembled condition and engaging a driven pinion gear; and FIG. 3 is an exploded isometric view showing the two major sections of the assembly.

DETAILED DESCRIPTION

As shown in the drawings, a preferred embodiment of the drive wheel assembly 10 of the invention comprises a rim section 11 and a hub section 12 which are removably joined together by suitable mechanical means, such as bolts 13.

Rim section 11 is shaped in the form of a circular ring having on its radially outer surface a generally flat, driving rim 14 adapted to engage and drive an endless saw band 16 (FIG. 2) or the like. For this purpose, driving rim 14 can be suitably provided with an outer surface designed to improve frictional engagement between the rim and saw band 16 which is driven thereby, as will be apparent to one skilled in the art. Driving rim 14 is also suitably provided with a circumferential flange 17 which helps to maintain the position of saw band 16 in operative relationship therewith, as shown in FIG. 2.

The radially inner surface of rim section 11 is provided with a plurality of circumferentially spaced, radially inwardly extending gear teeth 18. Teeth 18 are integrally formed in rim section 11 and have a specific configuration which is not critical for purpose of the invention. Teeth 18 may have any suitable form or size adapted to engage with the teeth of pinion gear 19, which is driven by motor 21 (FIG. 2) or by any other suitable means, as will be evident to those skilled in the art. The widths of driving rim 11 and teeth 18, measured along the axis of rim section 11, are not necessarily the same and are selected in accordance with the particular requirements of a given installation, e.g., the width of the saw band 16 driven thereby and the mechanical strength necessary to permit the requisite power to be transferred by pinion gear 19 through gear teeth 18 to driving rim 11.

The other major component of the assembly of the invention is a hub section 12, suitably in the form of a circular, generally flat plate 22, and provided at its center with a conventional hub 23 adapted to permit rotation of hub section 12 about an axis perpendicular to the plate, when mounted on shaft 24. In order to reduce the weight of hub section 12, it may be advantageous to provide circular cut-outs 26 as shown in FIG. 3. It is also preferred to undercut the lower surface 27 of plate 22, relative to the rim 28 thereof, in order to provide additional clearance for pinion gear 19, as shown.

In order to facilitate assembly of rim section 11 and hub section 12, it is preferred that the lateral surface 29 of rim section be countersunk adjacent gear teeth 18 to produce an interior ledge 31 against which rim 28 of hub section 12 abuts. The assembly is completed by means of bolts 13 passing through holes 32 in rim section 11 to engage appropriately spaced circumferential threaded holes 33 in hub section 12. In the assembled condition of the drive wheel, the axis of hub 23 is collinear with the axis of rim section 11, thus ensuring that the complete drive assembly 10 will rotate smoothly about shaft 24 without any wobble.

The foregoing detailed description has been given for clearness of understanding only, and no unnecessary limitations should be understood therefrom as modifications will be obvious to those skilled in the art.

What is claimed is:

1. A drive wheel assembly for a machine tool of the band saw type comprising:
   a rim section comprising a circular ring having a generally flat radially outer surface adapted to engage and drive an endless saw band or the like; said rim section being provided with a plurality of circumferentially spaced, radially inwardly extending gear teeth on its radially inner surface, said teeth being adapted to engage and be driven by a rotatable driven pinion gear;
   a hub section comprising a generally flat plate provided with a centrally located hub section adapted to permit rotation of said plate about an axis perpendicular to said plate; and
   mechanical attaching means for attaching said hub section to said rim section with said axis collinear with the axis of said rim section.

2. The assembly of claim 1 wherein said hub section is circular.

3. The assembly of claim 2 wherein a lateral surface of said rim section is countersunk to receive said hub section.

4. The assembly of claim 3 wherein said attaching means are a plurality of bolts circumferentially spaced about the periphery of said hub section.

* * * * *